United States Patent [19]

Irvin

[11] 4,406,750

[45] Sep. 27, 1983

[54] SOLVENT REMOVAL FROM POLYMER SOLUTION UTILIZING FLASHED VAPOR AS A HEAT SOURCE

[75] Inventor: Howard B. Irvin, Bartlesville, Okla.

[73] Assignee: Phillips Petroleum Company, Bartlesville, Okla.

[21] Appl. No.: 306,802

[22] Filed: Sep. 29, 1981

[51] Int. Cl.³ .......................... B01D 1/14; B01D 3/06; C08F 6/10
[52] U.S. Cl. ........................ 203/22; 203/14; 203/77; 203/88; 203/92; 203/100; 203/68; 203/69; 203/70; 159/2 R; 159/16 R; 159/24 A; 159/46; 159/47.1; 528/500
[58] Field of Search ............... 528/500, 501; 159/2 R, 159/47 R, 16 R, 46, 24 A; 260/96 R; 203/88, 14, 22, 24, 77, 27, 100, 96, 92, 49, 68–70; 202/180, 177, 159

[56] References Cited

U.S. PATENT DOCUMENTS

| | | | |
|---|---|---|---|
| 1,822,455 | 9/1931 | Ricard et al. | 203/27 |
| 2,168,570 | 8/1939 | Kraft | 203/27 |
| 2,996,492 | 8/1961 | Tegge et al. | 526/84 |
| 3,054,727 | 9/1962 | Von Kessel et al. | 203/22 |
| 3,254,024 | 5/1966 | Huckins et al. | 203/27 |
| 3,259,555 | 7/1966 | Lankton et al. | 203/63 |
| 3,280,091 | 10/1966 | Dance | 528/483 |
| 3,326,781 | 6/1967 | Wilson, Jr. | 203/83 |
| 3,357,900 | 12/1967 | Snell | 203/88 |
| 3,398,129 | 8/1968 | Leibson et al. | 528/498 |
| 3,458,494 | 7/1969 | Scoggin | 528/481 |
| 3,499,826 | 3/1970 | Sulzbach et al. | 203/27 |
| 3,640,978 | 2/1972 | Baba | 528/483 |
| 3,652,515 | 3/1972 | Love | 526/281 |
| 3,816,379 | 6/1974 | Rosenbaum et al. | 528/501 |
| 3,874,184 | 4/1975 | Harper et al. | 62/28 |
| 4,115,471 | 9/1978 | Kesler | 203/27 |
| 4,137,129 | 1/1979 | Biorklund | 203/88 |

Primary Examiner—Wilbur L. Bascomb, Jr.

[57] ABSTRACT

The energy requirements of a solution rubber process are significantly improved by employing solvent which has been removed in subsequent process steps.

The invention concerns the separation treatment of the solvents and the polymer solutions produced by solution polymerization. In one embodiment a polymer solution is flashed to remove solvent vapor overhead and a concentrated polymer solution is removed as bottoms. The flashed solvent vapor is divided into at least two streams. A first stream is used as a stripping vapor medium in a zone for stripping a wet solvent to recover a wet solvent vapor overhead from the stripping zone and a dry solvent liquid as bottoms; the second flashed solvent vapor stream is used to preheat the wet solvent feed to the stripping zone by indirect contact heat exchange; a third portion of said solvent vapor can be combined with the second portion downstream of the heat exchange step, and the combined stream can be condensed.

6 Claims, 1 Drawing Figure

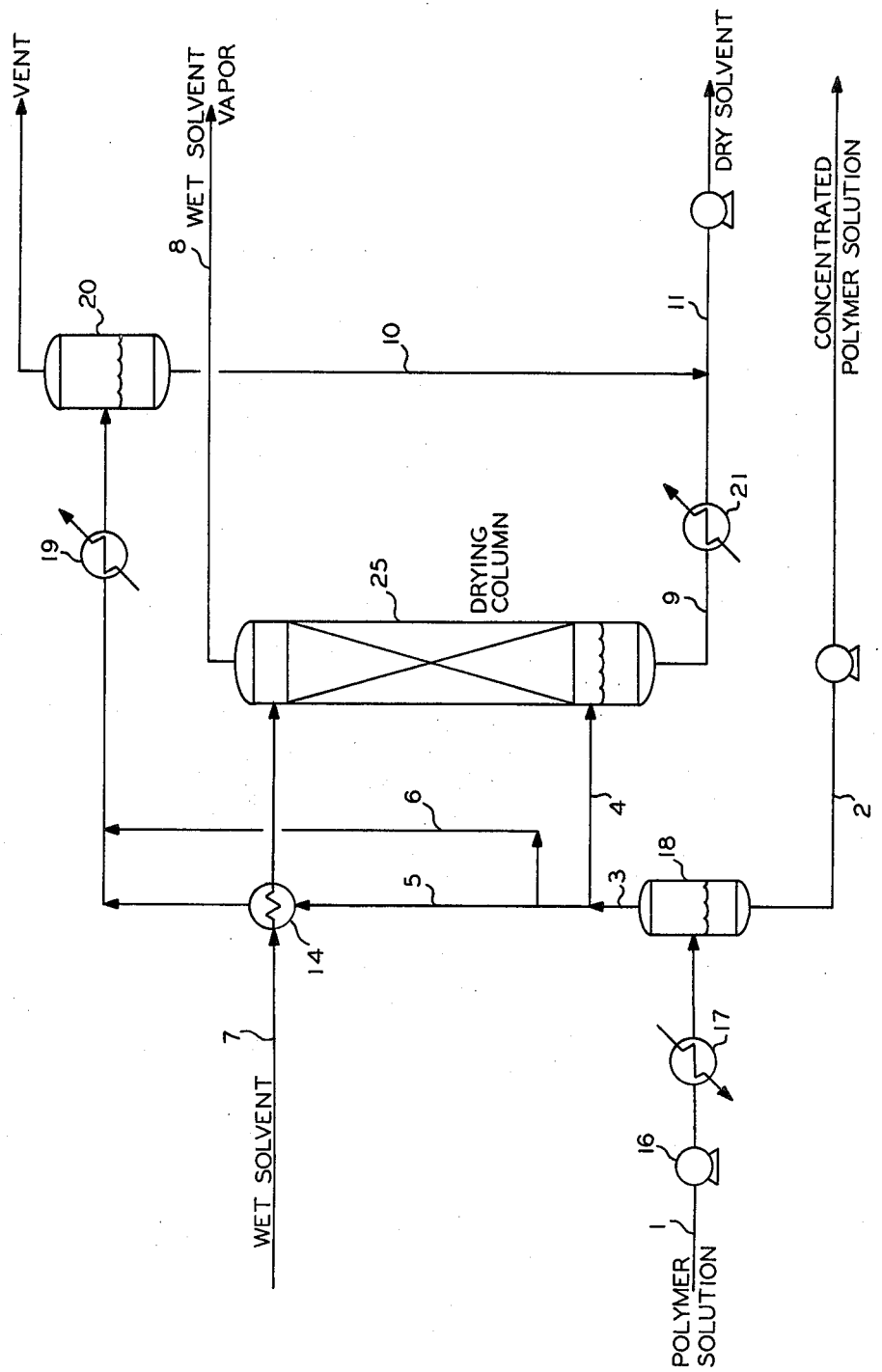

SOLVENT REMOVAL FROM POLYMER SOLUTION UTILIZING FLASHED VAPOR AS A HEAT SOURCE

BACKGROUND

Processes for the production of solution rubbers are large consumers of energy. Major areas for energy consumption are solvent removal from the polymer and subsequent solvent purification for recycle.

INVENTION

The invention deals with a system for removing solvent from solution rubbers by solvent separation combined with recycle solvent purification.

One embodiment of the invention involves a solution rubber process in which solvent is recovered from the rubber solution by flashing followed by steam stripping and the water wet solvent is subsequently dried in a solvent stripping zone. A first portion of the flashed solvent is utilized as stripping vapor in the solvent stripping zone, a second portion is used in indirect heat exchange to preheat wet solvent feed to the solvent stripper and the balance is conventionally condensed for recycle.

OBJECTS

It is an object of the invention to reduce energy consumption in solvent purification operations.

It is another object to recover energy from solvent removal operations.

It is a further object to reduce coolant requirements for condensing and cooling vaporized solvents following solvent removal.

ADVANTAGES

The system described herein requires significantly less steam than standard solvent removal systems. In those systems recycle solvent is purified by fractionation in a separation column using steam, for example, in a reboiler. Using the invention, solvent can be separated from water and lights using vapor from a polymer concentration step. No steam or extra heat is required.

DESCRIPTION OF THE INVENTION

The invention is applicable to the treatment of polymer solutions produced by solution polymerization. That is, the polymerization is conducted in the presence of organic solvents for the polymer.

Suitable solvents are those materials or combinations of materials which substantially dissolve the polymer. Useful solvents include hydrocarbons and substituted hydrocarbons which are relatively inert and which are liquid under polymerization conditions. Operable solvents encompass such compounds as paraffins, aromatics, and mixtures of two or more of these. Preferred solvents are cyclopentane, cyclohexane, n-hexane, other saturated six-carbon paraffins, benzene, toluene, methylcyclopentane and methylcyclohexane.

Polymers which may be handled in accordance with the invention are those whose miscibility with the solvents indicated above make them candidates for separation therefrom in accordance with the invention. Generally, applicable polymers will include those produced by polymerization in the presence of one or more organic solvents. Suitable polymers include those derived by polymerizing conjugated dienes alone or mixtures of conjugated dienes with one or more ethylenic monomers. Useful dienes encompass those containing 4 to 8 carbon atoms, for example, 1,3-butadiene, isoprene, 2,3-dimethylbutadiene, 2-methoxybutadiene, 1,3-octadiene, and the like. Suitable ethylenic monomers include aliphatic, cycloaliphatic, and aromatic compounds having the requisite unsaturation. They include styrene, alpha-methyl styrene, p-methyl styrene, acrylonitrile, methylacrylate, methylmethacrylate, vinyl chloride, methylvinyl ether, ethylene, propylene, 1-butene, 1-octene, allylcyanide, vinyl acetate, vinyl cyclohexene and the like.

The polymerization preferably takes place in the presence of suitable initiator systems for the reactants and conditions employed. One group of useful initiators is enumerated in U.S. Pat. No. 3,590,026, the disclosure of which is incorporated herein by reference.

In one embodiment of the invention a polymer solution in a suitable solvent is flash concentrated to remove a portion of the solvent therein. The flash concentration can be carried out using pre-heat and flash. The flash tank will be operated at temperatures and pressures such that the overhead vapors can be driven through the required process equipment, for example, about 25 psia and about 210° F. for cyclohexane solvent. The flashed vapor is then divided into three streams. One stream goes to a solvent stripping zone, for example the bottom of a solvent drying column, to strip out water and light hydrocarbons in the wet feed to the top of the column. Another stream goes to preheat the column feed to temperatures in the range of about 170 to 200, preferably about 180° F. so that any free water in the top of the column will solubilize or evaporate and so that the top section of the column will not be chilled and precipitate free water. As is generally known, free water could interfere with the drying ability of the column because of interphase diffusion rate problems. The warm dry liquid stream from the column feed heater is combined with the third stream from the solution flash tank as feed to a flash condenser. The cool, dry liquid from this condenser is combined with cooled liquid from the bottom of the solvent drying column or other solvent stripping zone and both are pumped to the dry solvent storage tank for recycle to the polymerization reactors.

When compared to processes in which flash overhead is all condensed and recycled and the solvent drying column is steam heated, the "energy-free" system of the invention results in substantial savings in steam and in total installed equipment costs. For example, on a 6,000 lb/hr rubber line, a savings of $25,000 per year in steam (at $4.00/1,000 lb) and $100,000 in equipment costs can be realized.

A preferred embodiment of the invention is described with reference to the FIGURE. Water wet solvent stream 7, primarily derived from polymer steam stripping and subsequent polymer devolatization operations is preheated in heat exchanger 14 and fed into the upper section of solvent drying column 25. Rubber solution 1 from polymerization is pumped via pump 16 and solution preheater 17 to flash tank 18 from which concentrated polymer solution 2 is removed for further processing such as steam stripping. Flash tank 18 is preferably operated at a somewhat higher pressure than the drying column 15 so that at least a portion of the dry flashed solvent vapor stream 3 can be introduced via 4 without compression into the lower section of the drying column to supply boilup vapor requirements. Obviously an auxiliary reboiler could also be used on the drying column, but this will generally be unnecessary. A second portion of dry solvent vapor stream 3 passes via 5 to exchanger 14 where it is contacted by indirect heat exchange with the wet solvent feed to preheat the latter stream. The remainder of dry solvent vapor stream 3 by-passes exchanger 14 via line 6 and joins condensed stream 5, the combined stream being further cooled and condenses in cooler 19 and accumulated in receiver 20. Dry solvent 9, the bottom product of the drying column, is cooled in cooler 21 and joins the dry solvent stream 10 to be pumped to storage for recycle, preferably without heat recovery, to process uses requiring dry solvent, e.g., the polymerization reactor(s).

Process conditions for the flash tank and drying column will depend upon the solvent used, the polymer being processed, and local conditions such as temperature of available cooling water and the like, as will be apparent to one skilled in the art. As previously mentioned, it is preferred that the polymer solution flash tank be operated at a somewhat higher pressure than the drying column to facilitate introduction of flashed solvent into the solvent drying column without need for vapor compression. Preferred drying column pressure is from near atmospheric to about 50 psia (about 345 kPa), but higher pressures may be used. Flash tank pressure will generally be about 2–20 psi (about 14–140 kPa) above column pressure. Operating temperatures will be dependent upon the boiling point and vapor pressure curve of the solvent used.

EXAMPLE

A 14 wt.% solution of rubber (75/25 butadiene/styrene copolymer) dissolved in cyclohexane solvent is pumped at a rate of 42,840 lb/hr. (19,429 kg/hr.) through a steam preheater wherein it is preheated to 328° F. (164° C.), then flashed at 25 psia (172 kPa) at 210° F. (99° C.) to yield 24,000 lb/hr. (10,884 kg/hr.) of 25% polymer solution and 18,860 lb/hr. (8553 kg/hr.) of solvent vapor, 4,600 lb/hr. (2086 kg/hr.) of which is introduced into the base of a solvent drying column operating at 18 psia (124 kPa) head pressure. Wet solvent from storage at a rate of 22,745 lb/hr. (10,315 kg/hr.) is preheated to 180° F. (82° C.) by heat exchange with 7,150 lb/hr. (3,243 kg/hr.) of solvent vapor from the flash tank, the remainder of which is by-passsed to the dry solvent condenser along with feed exchanger effluent dry solvent. These vapors are condensed and combined with dry solvent column bottoms, 22,740 lb/hr. (10,313 kg/hr.), and pumped to dry solvent storage. Wet solvent column overhead vapor at a rate of 4,605 lb/hr. (2,088 kg/hr.) and at 172° F. (78° C.) is sent to a wet solvent condenser for solvent recovery.

Reasonable variations, such as would occur to the skilled artisan, may be made in the invention without departing from the scope thereof.

I claim:

1. A process for the flash separation of solvent from a polymer solution and drying of a wet solvent with flashed solvent which comprises the steps of:
    (a) passing a polymer solution to a flash zone and therein subjecting same to flashing conditions such that solvent vapor is flashed overhead and a solution concentrated in polymer is removed as bottoms,
    (b) dividing the flashed solvent vapor in (a) into at least two portions,
    (c) introducing a first portion of said flashed solvent vapor as stripping medium into a lower portion of a stripping zone,
    (d) passing a wet solvent feed to an upper portion of said stripping zone and contacting same with said stripping medium under conditions such that wet solvent vapor is removed overhead and dry solvent liquid is removed as bottoms from said stripping zone, and
    (e) passing a second portion of said flashed solvent vapor in indirect heat exchange with the wet solvent feed being passed to said stripping zone to preheat the feed to the stripping zone.

2. A process according to claim 1 wherein a third portion of said flashed solvent vapor in (a) is combined with said second portion after indirect heat exchange and the combined stream is condensed.

3. A process according to claim 2 wherein the flash zone is operated at a pressure somewhat higher than said stripping zone so that said first portion of flashed solvent vapor can be introduced without compression into a lower portion of said stripping zone.

4. A process according to claim 2 wherein the solvent flashed from the polymer solution and the wet solvent feed passed to the stripping zone are the same.

5. A process according to claim 1 including the further step of:
    (f) condensing said second portion after indirect heat exchange in (e) and separating dry solvent from the condensate formed.

6. A process for the separation of solvent from a polymer solution by flashing wherein at least a portion of the flashed solvent is used as stripping medium for contacting with water wet solvent in a solvent stripping zone which process comprises the steps of:
    (a) dividing flashed solvent into at least three portions,
    (b) passing a first portion of the flashed solvent as stripping vapor to said solvent stripping zone,
    (c) introducing a water wet solvent into said solvent stripping zone and contacting said wet solvent with said stripping vapor under conditions such that wet solvent vapor is taken overhead and dry solvent as bottoms,
    (d) passing a second portion of the flashed solvent in indirect heat exchange with wet solvent feed passed to said solvent stripping zone to preheat the wet solvent feed,
    (e) combining a third portion of said flashed solvent with said second portion after said heat exchange and condensing the combined stream, and
    (f) recovering dry solvent from the condensate formed in (d).

* * * * *